No. 738,445. PATENTED SEPT. 8, 1903.
E. G. HOFFMANN.
DEVICE FOR SECURING PARTS TO SHAFTS.
APPLICATION FILED JAN. 21, 1903.
NO MODEL.

WITNESSES.
A. N. Jesborra
L. E. Varney

INVENTOR.
Ernst Gustav Hoffmann
by Redding, Kiddle & Greeley
his Attys

No. 738,445. Patented September 8, 1903.

UNITED STATES PATENT OFFICE.

ERNST GUSTAV HOFFMANN, OF CHELMSFORD, ENGLAND.

DEVICE FOR SECURING PARTS TO SHAFTS.

SPECIFICATION forming part of Letters Patent No. 738,445, dated September 8, 1903.

Application filed January 21, 1903. Serial No. 139,886. (No model.)

*To all whom it may concern:*

Be it known that I, ERNST GUSTAV HOFFMANN, a subject of the German Emperor, residing at Chelmsford, Essex, England, have invented a certain new and useful Improved Device for Securing Parts to Shafts, of which the following is a specification.

This invention relates to an improved device for securing parts to shafts, such as a collar or the cone portion or sleeve of a ball-bearing, or for securing one shaft to another, the object being to provide a simple and effective device which can be positively engaged and disengaged as desired of the class in which a cone forms the connection between the parts to be connected or coupled, the movement being obtained from a threaded nut engaging both the cone and the part to be secured to the shaft or forming part of the securing device.

According to my invention I provide an improved construction in which the nut and cone are after engagement more or less permanently held together, so that they can be handled as one piece, whereby they are much more readily placed in position and withdrawn.

My invention is illustrated in the accompanying drawings, in which—

Figure 1:
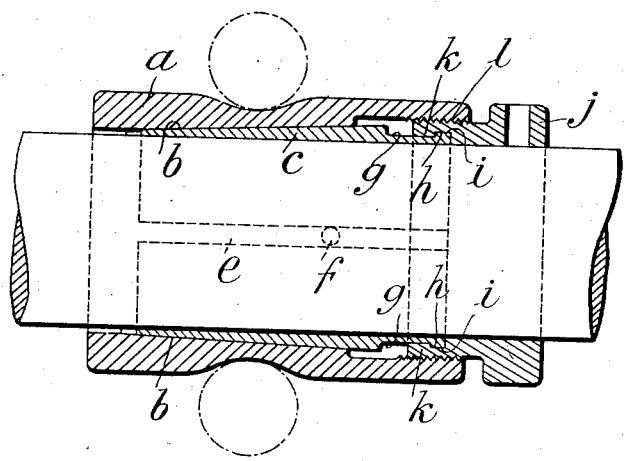
Figure 2:
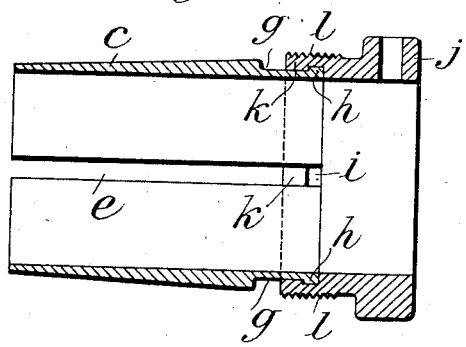

Figure 1 is a section of a collar forming part of a ball-bearing held to a shaft according to my invention, and Fig. 2 is a section of the connected nut and cone withdrawn.

It will be seen that the collar $a$, which is to be affixed to the shaft, has a tapered interior portion at $b$, inside of which is the tapered cone $c$, split at $e$, which is slidable on the shaft, the split or gap $e$ being engaged by a pin or projection $f$ on the interior of the collar $a$, so that the collar $a$ cannot turn on the cone. Near the outer end the cone $c$ is recessed at $g$, so as to leave a shoulder $h$ at the end, with which engages a recess $i$ in the interior of a nut $j$, the end of which has a shoulder $k$, which engages with the recess $g$, while the exterior of the nut $j$ is threaded at $l$ to allow it to engage with corresponding threads on the interior of the collar $a$. The cone and nut are first engaged together by compressing the former until the shoulder $k$ can pass over the shoulder $h$ as it is inserted into the interior of the nut, the parts engaging loosely as soon as the cone is allowed to expand, so that they are in the position shown in Fig. 2. The nut and cone in this condition are slid along the shaft into the interior of the collar, and the screw-thread $l$ on the nut engages with the thread of the collar, which when the nut is rotated in one direction will draw the collar $a$ tightly onto the cone and in turn compress the latter on the shaft, and when the nut is rotated in the other direction will push the collar $a$ off the cone and release both from the shaft.

What I claim is—

In combination, a split cone, having a recessed and shouldered end, a nut having an exterior thread and an interior recessed and shouldered portion adapted to engage the corresponding parts of the cone, and an internally coned and screwed part into which the cone is adapted to fit and with the screwed part of which the nut engages.

In testimony whereof I have hereunto set my hand in the presence of two subscribing witnesses.

ERNST GUSTAV HOFFMANN.

Witnesses:
ALLEN PARRY JONES,
EDWARD TRUMP FOSTER.